(No Model.)

J. W. EVERHART.
VEHICLE HEATER.

No. 432,389. Patented July 15, 1890.

WITNESSES:
W. A. Hall
George H. White

INVENTOR
John W. Everhart
BY
I. J. Cilley
ATTORNEY

UNITED STATES PATENT OFFICE.

JOHN W. EVERHART, OF ALLENDALE, MICHIGAN.

VEHICLE-HEATER.

SPECIFICATION forming part of Letters Patent No. 432,389, dated July 15, 1890.

Application filed October 19, 1889. Serial No. 327,554. (No model.)

*To all whom it may concern:*

Be it known that I, JOHN W. EVERHART, a citizen of the United States, residing at Allendale, in the county of Ottawa and State of Michigan, have invented a new and useful Improvement in Vehicle-Heaters and Head-Lights, of which the following is a specification.

My invention relates to an improvement in heaters and head-lights for use upon buggies, cutters, and other road-vehicles; and the objects of my invention are, first, to provide a heater and head-light for road-vehicles that will admit of the use of an ordinary hand-lantern as the source of light and heat, and, second, to provide a vehicle-heater for use with an ordinary hand-lantern that may be readily attached either to a vertical or a horizontal support, as the dash-board or the floor of the vehicle. I attain these objects by the mechanism illustrated in the accompanying drawings, in which—

Figure 1:
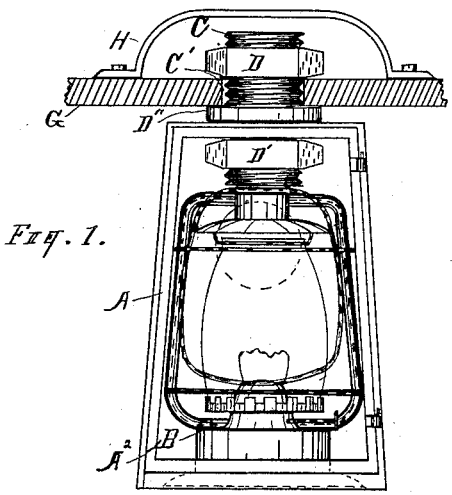
Figure 3:
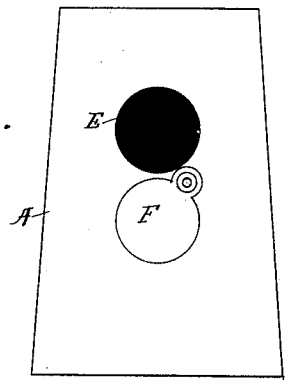
Figures 2, 4:
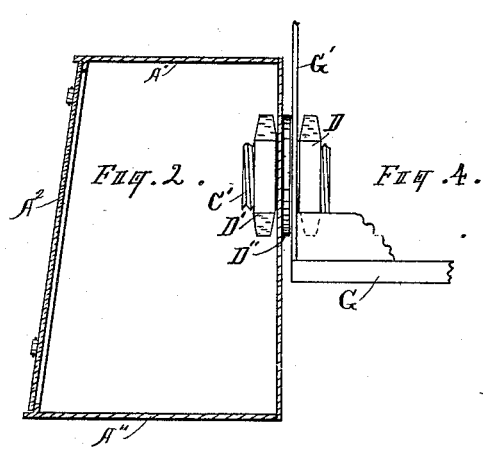
Figure 5:
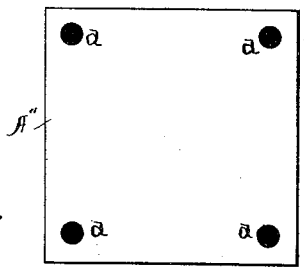
Figure 6:
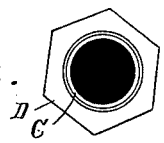

Figure 1 is a front elevation of my appliance with a lantern in place. Fig. 2 is a vertical section of the side of the case, showing the manner of attaching it to a dash-board or other vertical support. Fig. 3 is a back elevation of the same, showing the aperture for the reception of the support and a cover for closing the aperture when desired. Fig. 4 is a plan of the top of the case, showing the aperture and cover. Fig. 5 is a plan of the bottom of the case, showing vent-holes for the entrance of air; and Fig. 6 is an end view of the support and its burr or nut.

Similar letters refer to similar parts throughout the several views.

A is the case.

B is the lantern.

C is a tube for supporting the case and conducting the heat to the vehicle.

D and D' are burrs for securing the case to the vehicle.

D'' is a washer to prevent the case from coming into too close contact with the woodwork of the vehicle.

E and E' are openings for the reception of the supporting-tube and for the escape of heat.

F and F' are covers or valves for covering the openings.

G is the bottom of the vehicle-box, and G' is the dash-board of a vehicle.

In constructing my vehicle-heater I construct a case A of any suitable material and form of a proper size to conveniently receive a small-sized lantern with the sides and back opaque and the front open, or provided with a glass door for the transmission of light. In the bottom of the case I make apertures *a* for the entrance of air to supply the air necessary for perfect combustion. In the top of the case I make an opening E, large enough to receive the tube C for the purpose of securing the case under the floor of the vehicle-box, and a corresponding opening in the back of the case for securing the case to the dash-board of the vehicle, and provide each with a cover F and F', pivoted near the opening, so that they may be thrown around to entirely close or to open the apertures at pleasure. I then provide a hollow bolt or tube (as of gas-pipe) with a thread cut upon its outer surface for the reception of the burrs D and D'.

To attach my case to the vehicle under the floor of the box, I bore a hole C' through the floor, insert the tube C into the aperture E' in the top of the case, put the burr D' in position upon the tube inside of the case, place the washer D'' upon the tube above the case, pass the tube C up through the aperture C' in the floor of the vehicle, and secure it in place with the burr D above the floor, as shown in Fig. 1, and, if desired, a guard H, of cast-iron or other suitable material, may be placed over the end of the tube and secured to the floor or to the dash-board of the vehicle, with the ends left open for the escape of heat and to assist the combustion, the object of this guard being to prevent dust, &c., from falling through into the case and to distribute the heat by diverting its course from a direct line from the case to the ends of the guard. I leave both ends of the guard open, so that all of the heat from the lantern will be distributed in the box of the vehicle.

To attach my device to the dash-board of a vehicle, I remove the burr D, take the tube out of the top of the case and pass it through the opening E' in the back of the case and through a hole in the dash-board prepared for its reception, and secure it in place by means of the burr D. The same guard shown in Fig. 1 is applicable here, but should be applied with the open ends crosswise of the box, so that the upper side will be closed.

When using my device as a head-light and heater combined, if under the floor of the vehicle, I close the opening E with the cover F and allow all the heat to pass up into the vehicle, and when attached to the dash-board of the vehicle I close the aperture E' in the top of the case and allow all of the heat to enter the box of the vehicle through the tube C in the opening E. When using it simply as a head-light, I swing the cover F' and open the aperture E, if the case is secured to the dash-board, and allow the heat to escape through the opening direct without entering the vehicle, and if the case is secured under the floor of the vehicle-box I open the aperture E and allow a draft of cold air to enter the case above the lantern and reduce the temperature of the air that passes into the vehicle and allow a portion of the heated air to escape through this opening outside of the vehicle.

The front of my case is provided with a glass door $A^2$, hinged upon the case, so that it may be opened and closed for inserting or removing the lantern.

To remove the case from the vehicle, all that is necessary is to remove the burr D and withdraw the tube C from the opening through the floor or dash-board of the vehicle.

I am aware that prior to my invention cases have been made for holding lamps for lighting and heating vehicles. I therefore do not claim such, broadly, as my invention; but What I do claim as new, and desire to secure by Letters Patent, is—

1. The combination, in a vehicle-heater, of a lantern, a case having opaque sides and back, a transparent door, openings in the bottom for the ingress of air and openings for the egress of the products of combustion, with a tube provided with a screw-thread upon the outer surface, burrs to secure the tube to the case and to the vehicle, and a washer, substantially as and for the purpose set forth.

2. The combination, in a vehicle-heater, of a lantern and a case having opaque sides and back, a transparent front, and openings in the bottom for the ingress of air, with openings for the escape of heat and the reception of the air-tube, an air-tube provided with a screw-thread upon its outer surface, burrs for securing the case to the vehicle, a washer to hold the surface of the case away from the surface of the vehicle, and covers for closing the openings E and E' in the case, substantially as and for the purpose set forth.

3. The combination, in a heater and head-light for vehicles, of a lantern, a case for holding the lantern and securing it to the vehicle, said case having openings for the ingress of air, with openings for the escape of heated air and for the reception of an air-tube or support, a cover for closing the egress-opening not in use, a tube provided with a screw-thread on its outer surface, said tube to act as a support for securing the case to the vehicle and as an air-passage for the escape of the heated air, burrs to engage with the screw-thread on the tube for securing the case to the vehicle, a washer to prevent the surface of the case from coming in contact with the support, and a guard to cover the end of the tube inside of the vehicle, substantially as and for the purpose set forth.

JOHN W. EVERHART.

In presence of—
ITHIEL J. CILLEY,
JOHN C. BUCHANAN.